US009756866B2

United States Patent
Jefferson

(10) Patent No.: US 9,756,866 B2
(45) Date of Patent: *Sep. 12, 2017

(54) SYSTEMS, METHODS, AND DEVICES FOR REMOVING MATERIAL FROM FEET OF POULTRY

(71) Applicant: Wayne Allen Jefferson, Greenville, SC (US)

(72) Inventor: Wayne Allen Jefferson, Greenville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/043,901

(22) Filed: Feb. 15, 2016

(65) Prior Publication Data
US 2016/0242426 A1    Aug. 25, 2016

Related U.S. Application Data

(60) Division of application No. 14/354,661, filed as application No. PCT/US2012/062279 on Oct. 26, 2012, now Pat. No. 9,259,012, and a continuation-in-part of application No. 13/281,581, filed on Oct. 26, 2011, now Pat. No. 8,827,775.

(51) Int. Cl.
A22B 5/08      (2006.01)
A22C 21/00     (2006.01)

(52) U.S. Cl.
CPC ...... *A22C 21/0061* (2013.01); *A22C 21/0007* (2013.01); *A22C 21/0053* (2013.01)

(58) Field of Classification Search
CPC ...... A22C 21/0061; A22B 5/08; A22B 5/0082
USPC ............................ 452/81, 114, 120, 123, 173
See application file for complete search history.

(56) References Cited

U.S. PATENT DOCUMENTS

| 3,689,958 A | | 9/1972 | Dillon | |
|---|---|---|---|---|
| 3,696,464 A | * | 10/1972 | Dillon | A22C 21/0053 452/167 |
| 3,918,123 A | | 11/1975 | Harben, Jr. | |
| 5,484,332 A | | 1/1996 | Leech et al. | |
| 5,514,033 A | * | 5/1996 | Berry | A22B 1/00 452/178 |
| 5,863,244 A | | 1/1999 | Mansfield et al. | |
| 5,882,253 A | | 3/1999 | Mostoller | |
| 5,980,375 A | | 11/1999 | Anderson et al. | |

(Continued)

FOREIGN PATENT DOCUMENTS

GB      1268593      3/1972

OTHER PUBLICATIONS

Spraying Systems Co., "Spray Products for the Car Wash Industry," brochure, Copyright 2008.

(Continued)

*Primary Examiner* — Richard Price, Jr.
(74) *Attorney, Agent, or Firm* — J. Bennett Mullinax, LLC

(57) ABSTRACT

Systems, methods, and devices are disclosed for removing lesion material from poultry feet. The systems, for example, can include at least one spray head located along a travel path of a plurality of movable shackles within a poultry processing line. Each shackle can be configured to hold a poultry member in a processing position as the shackles are moved along the processing line. The spray head configured to spray feet of the poultry members held by the plurality of shackles to remove the lesion material from the feet.

20 Claims, 14 Drawing Sheets

(56) References Cited

U.S. PATENT DOCUMENTS

| | | | |
|---|---|---|---|
| 6,254,472 B1* | 7/2001 | Meyn | A22C 21/0053 452/182 |
| 6,283,848 B1* | 9/2001 | Berry | A22C 21/00 452/166 |
| 6,450,872 B1 | 9/2002 | Haley et al. | |
| 6,733,379 B2* | 5/2004 | Tsang | A22C 17/08 452/173 |
| 7,077,738 B2* | 7/2006 | Benson | B23Q 11/02 452/149 |
| 7,226,349 B2 | 6/2007 | Berry | |
| 7,378,642 B2* | 5/2008 | Jones | A22C 21/00 209/576 |
| 8,066,556 B2* | 11/2011 | Kjeldsen | A22C 21/04 452/76 |
| 8,202,143 B1* | 6/2012 | Taylor | A22B 5/0058 452/166 |
| 8,646,429 B2 | 2/2014 | Agneray et al. | |
| 8,684,799 B2 | 4/2014 | Brink et al. | |
| 8,708,784 B2 | 4/2014 | Bakker | |
| 8,821,222 B2 | 9/2014 | Van De Nieuwelaar et al. | |
| 8,827,775 B2 | 9/2014 | Jefferson, Sr. | |
| 9,259,012 B2 | 2/2016 | Jefferson | |
| 2005/0221750 A1 | 10/2005 | Austin | |
| 2008/0125024 A1 | 5/2008 | Berry | |
| 2010/0151779 A1 | 6/2010 | Bakker | |
| 2010/0297923 A1 | 11/2010 | Brown | |

OTHER PUBLICATIONS

Spraying Systems Co., "Windjet Aire Products Catalog 20D," brochure, Copyright 2008.
International Search Report and Written Opinion for PCT/US2012/062279 dated Apr. 11, 2013.

* cited by examiner

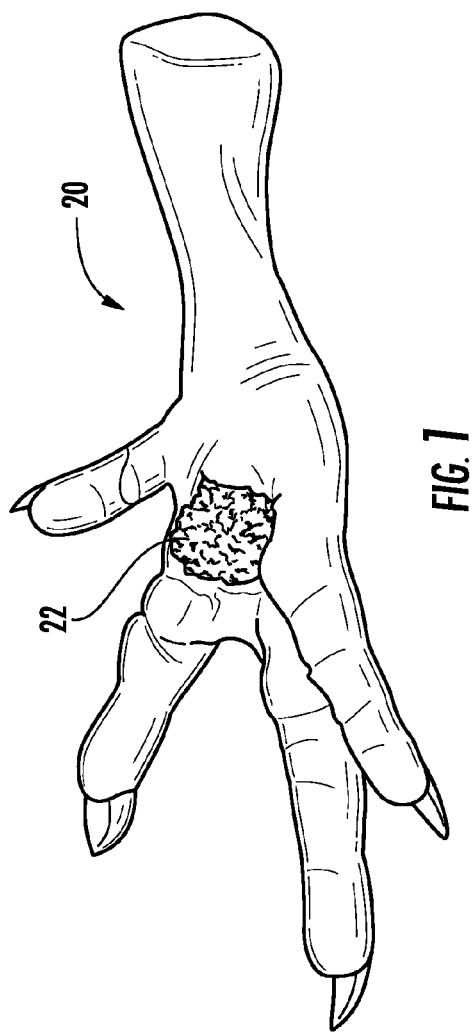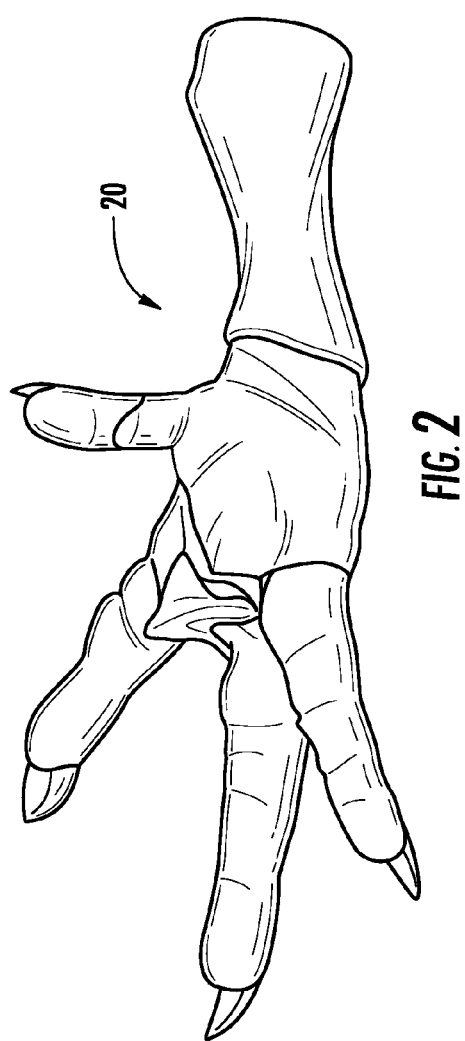

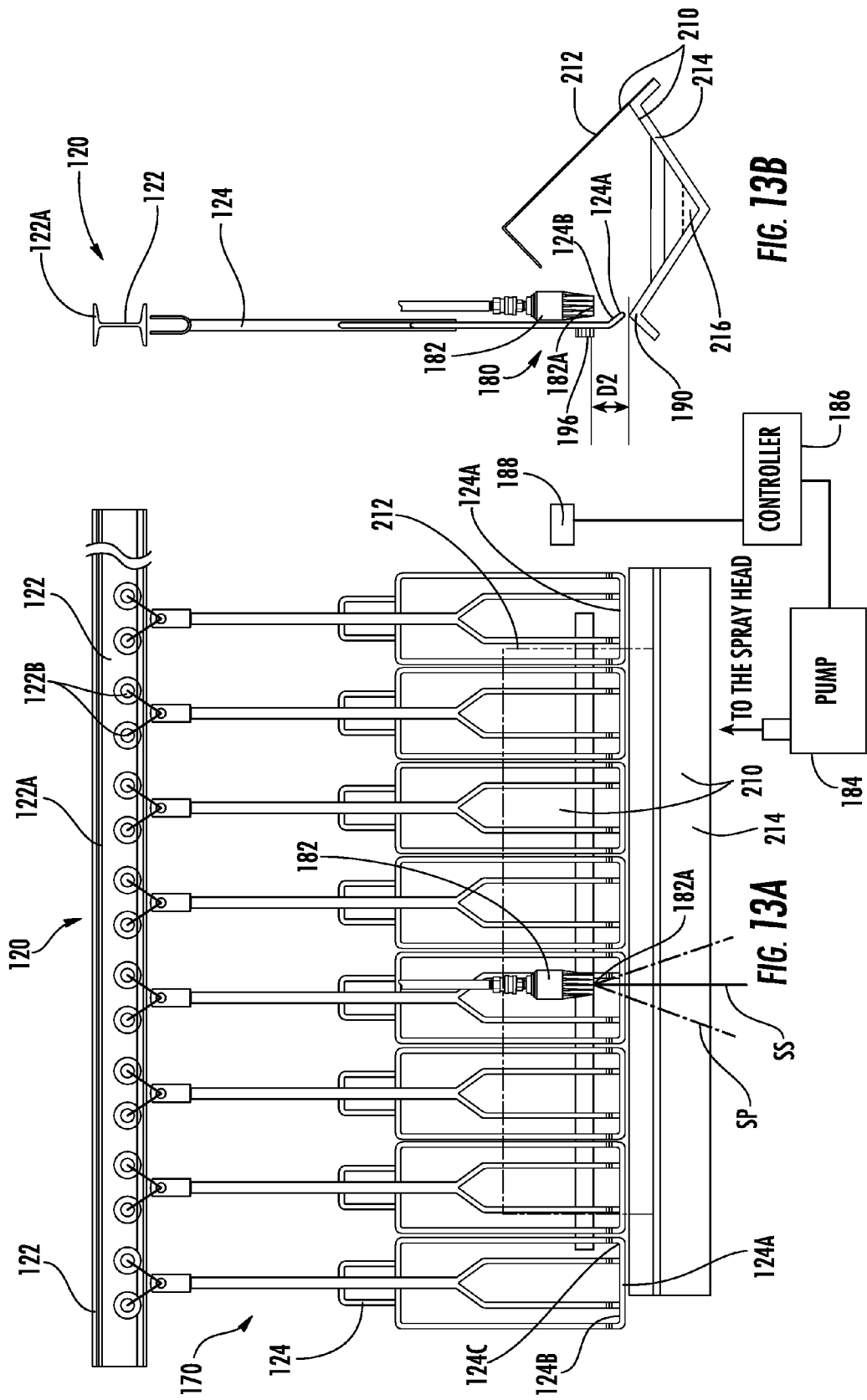

SYSTEMS, METHODS, AND DEVICES FOR REMOVING MATERIAL FROM FEET OF POULTRY

RELATED APPLICATIONS

This application is a divisional patent application of U.S. patent application Ser. No. 14/354,661, filed Apr. 28, 2014, and claims the benefit of the filing date of U.S. patent application Ser. No. 13/281,581, filed Oct. 26, 2011, issued as U.S. Pat. No. 8,827,775, on Sep. 9, 2014, and U.S. patent application Ser. No. 14/354,661, filed Apr. 28, 2014, the disclosure of both applications incorporated herein by reference in their entireties.

TECHNICAL FIELD

The subject matter disclosed herein relates to systems, methods, and devices for removing material from the feet of poultry.

BACKGROUND

The demand for poultry, and especially chicken feet (sometimes called paws) as a specialty food item, particularly in Asia, is relatively great. After paws are removed from chickens during processing, the paws are graded according to various quality factors. The value of a paw varies greatly depending on the grade.

There are three principal grades: condemned grade, sub-grade, and A-grade. Condemned grade paws are used primarily as a component in animal feeds. Sub-grade and A-grade paws are used principally for human consumption. An A-grade paw may be worth in the range often times that of a condemned paw, and several times a sub-grade paw. Therefore, it would be commercially advantageous to minimize the number of paws that are classed as condemned grade and to maximize the number of paws that are classed as A-grade.

Typically, sorting of paws by grade is done by hand upon visual inspection, separating paws from one stream into three. This can be a time consuming exercise, and often results in many paws being graded condemned or sub-grade.

One of the principal factors causing a paw to be graded below A-grade is the presence and size of dark sores or lesions on the paw, for example on the metatarsal pad. These sores (also sometimes called blisters) often are urea/ammonia burns that arise from contact between the chicken and chicken feces present on the floor where the chicken is kept. FIG. 1 shows a paw 20 with a large lesion 22 on a bottom surface that would mandate a reduced grade for the paw.

Certain methods have been used to prevent the burns from occurring, including treating the chicken houses with ammonium bisulfate or dilute phosphoric acid in order to reduce the corrosive nature of the ammonia present. Bacterial treatment of the ammonia has also been used. These methods are all preventative in nature and are only partially effective in preventing lesion formation. There are also cost chemical safety issues with such treatments.

It has also been proposed to remove lesions from the paws in an attempt to improve grading. This removal can be done manually. However, there are drawbacks to manual removal. First, manual removal is labor intensive and time consuming, therefore expensive. Also, it is difficult to fully remove a lesion by hand with a sharp object without otherwise damaging the paw, leading to grade below A-grade.

Removal has also been proposed via mechanically driven brush-type or rubber finger contact based systems, which essentially scrape the paw surfaces in an attempt to remove the lesions. However, these systems are also destructive to the paws, again often leading to a grade below A-grade.

Accordingly, a device, system and method that can remove lesions from chicken paws while addressing one or more drawbacks of discussed above or others would be welcome.

SUMMARY

Aspects and advantages of the invention will be set forth in part in the following description, or may be obvious from the description, or may be learned through practice of the invention.

According to certain aspects of the disclosure, a device is disclosed for removing lesion material from poultry feet including a frame defining an input zone, a cleaning zone, and an output zone. A conveyor moves poultry feet sequentially through the input zone, the cleaning zone, and the output zone, the conveyor configured for holding the poultry feet in a cleaning position. At least one spray head is located in the cleaning zone for spraying the poultry feet while held by the conveyor in the cleaning position to remove the lesion material. Various options and modifications are possible.

According to certain other aspects of the disclosure, a device is disclosed for removing lesion material from poultry feet including a frame defining an input zone, a cleaning zone, and an output zone. A conveyor moves poultry feet sequentially through the input zone, the cleaning zone, and the output zone at a speed in a range of about 3.0 to about 12.0 inches per second, the conveyor configured for holding the poultry feet in a cleaning position. At least one spray head is located in the cleaning zone below the conveyor for spraying the poultry feet while held by the conveyor in the cleaning position to remove the lesion material, the spray head pressure being in the range of about 1600 to about 3200 pounds per square inch (psi). Again, various options and modifications are possible.

According to certain additional aspects of the disclosure, a system for removing lesion material from feet of poultry within a poultry processing line is disclosed. The system can include a plurality of shackles movable along a travel path of a poultry processing line. Each shackle can be configured to hold a poultry member in a processing position as the shackles are moved along the processing line. The system can also comprise at least one spray head located along the travel path of the plurality of shackles, the spray head configured to spray feet of the poultry members held by the plurality of shackles to remove the lesion material from the feet.

According to certain other aspects of the disclosure, a device is disclosed for removing lesion material from poultry feet. The device can comprise at least one spray head configured to spray feet of poultry members being processed along a poultry processing line to remove lesion material from the feet. The device can also comprise a pump for supplying fluid for dispensing from the spray head. The pump can be connected to a fluid source and the spray head to supply fluid to the spray head. The device can also comprise a controller in operational communication with the pump. The controller can be configured for controlling the dispensing of the fluid from the spray head at a fluid pressure generated by the spray head and the pump to generate a fluid speed that removes lesion material from the feet.

According to certain further aspects of the disclosure, a method is disclosed for removing lesion material from feet of poultry within a poultry processing line. The method can comprise positioning at least one spray head along a travel path of poultry members being processed within a poultry processing line. The spray head can comprise a dispensing end in proximity to feet of the poultry members being processed in the processing line as the poultry members move by the spray head along the travel path. The method also can comprise spraying the feet of the poultry members with fluid under pressure and removing lesion material from the feet of the poultry members with the fluid being dispensed from the dispensing end of the spray head.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of a chicken paw with a lesion;

FIG. 2 is a perspective view of a chicken paw after removal of the lesion;

FIG. 13A is a schematic side view of an embodiment of a system using a device for removing lesions from chicken paws configured for use within a chicken processing line according to the subject matter disclosed herein;

FIG. 13B is a schematic end view of the embodiment of the system using the device for removing lesions from chicken paws configured for use within a chicken processing line according to FIG. 13A;

DETAILED DESCRIPTION

Figure 3:
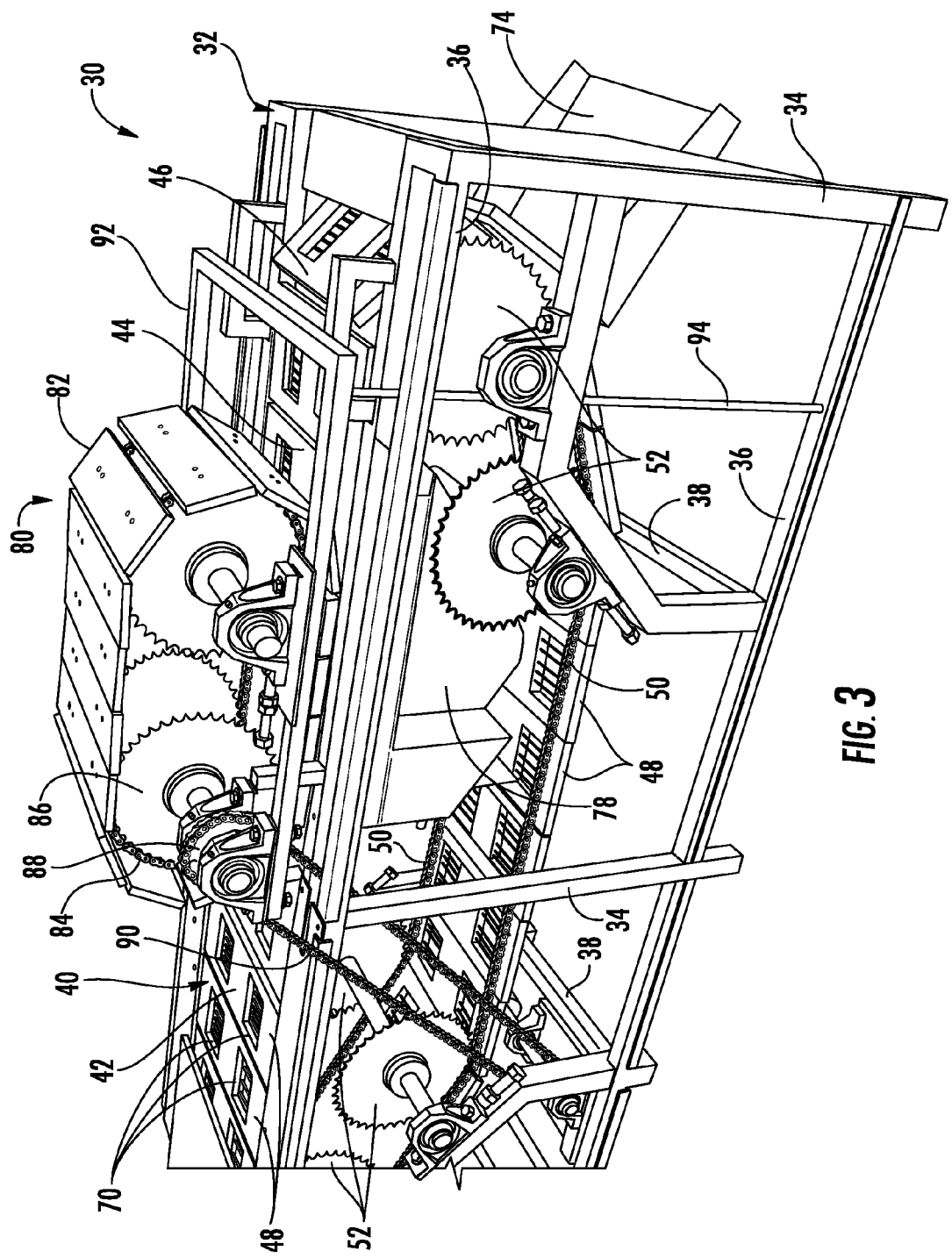
FIG. 3 is a perspective view of a portion of an embodiment of a device for removing lesions from chicken paws according to the subject matter disclosed herein.

Reference now will be made in detail to embodiments of the present subject matter, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

"Poultry Member" as used herein means generally an individual bird from a class or category of birds that are domesticated and kept by humans for the purpose of using their meat for sustenance and which can be raised and processed in bulk in the poultry industry. Poultry members, for example, can include, but are not limited to, chickens, turkeys, ducks, or the like.

As noted above, FIG. 1 shows a paw 20 with a lesion 22 thereon. FIG. 2 shows the paw 20 after removal of the lesion, for example by a device as described below. The assemblies of FIGS. 3-11 provide a spray head based system for substantially removing such lesions so as to achieve a paw as in FIG. 2, thereby being gradable higher than the paw as in the condition of FIG. 1.

As shown in FIGS. 3-8, a device 30 includes a frame 32 including a number of upright pieces 34, horizontal pieces 36 and cross pieces 38. It should be understood that frame 32 can have many different configurations. Frame 32 supports a conveyor 40 that is driven through an input zone 42, a cleaning zone 44 and an output zone 46 on an upper level. A lower level of conveyor returns from output zone 46 to input zone 42.

Figure 6:
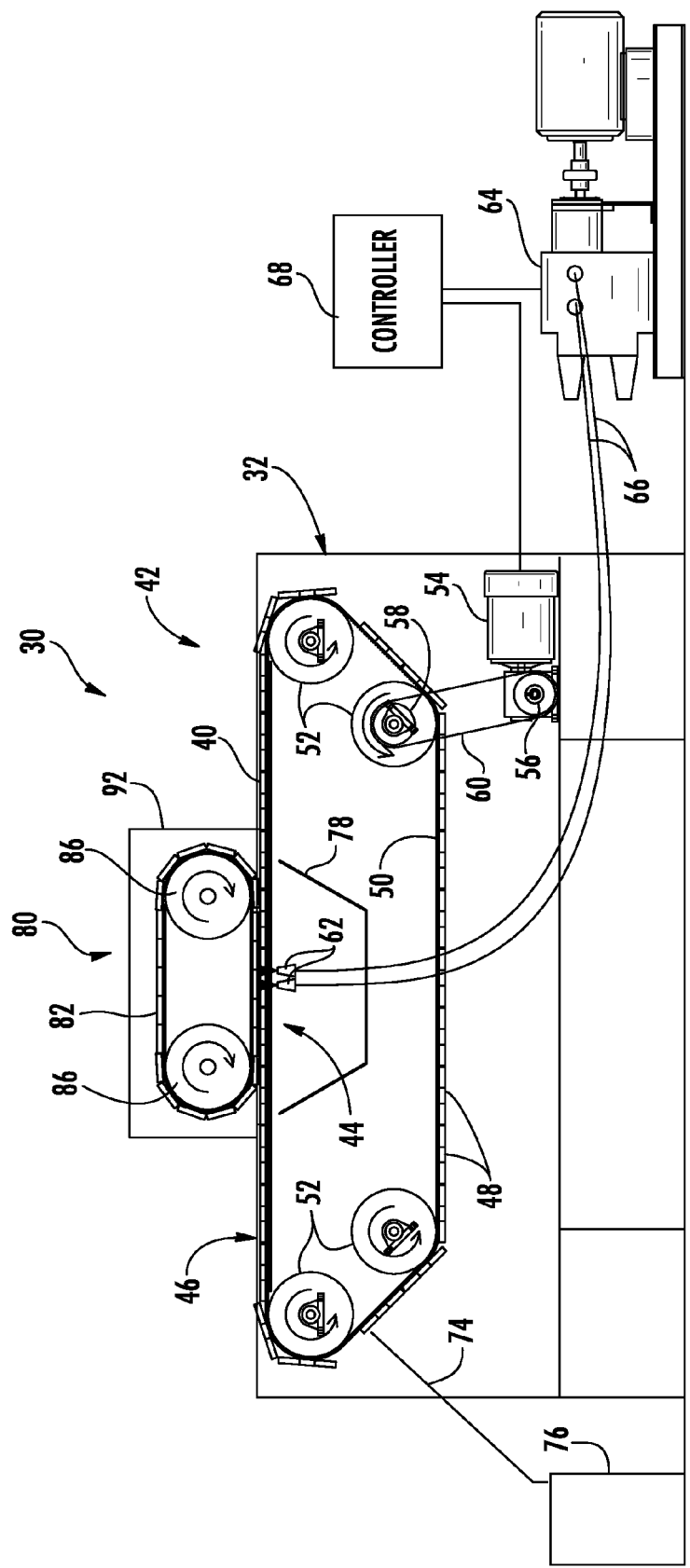
FIG. 6 is a schematic side view of a device as in FIG. 3 showing controls.
Figure 7:
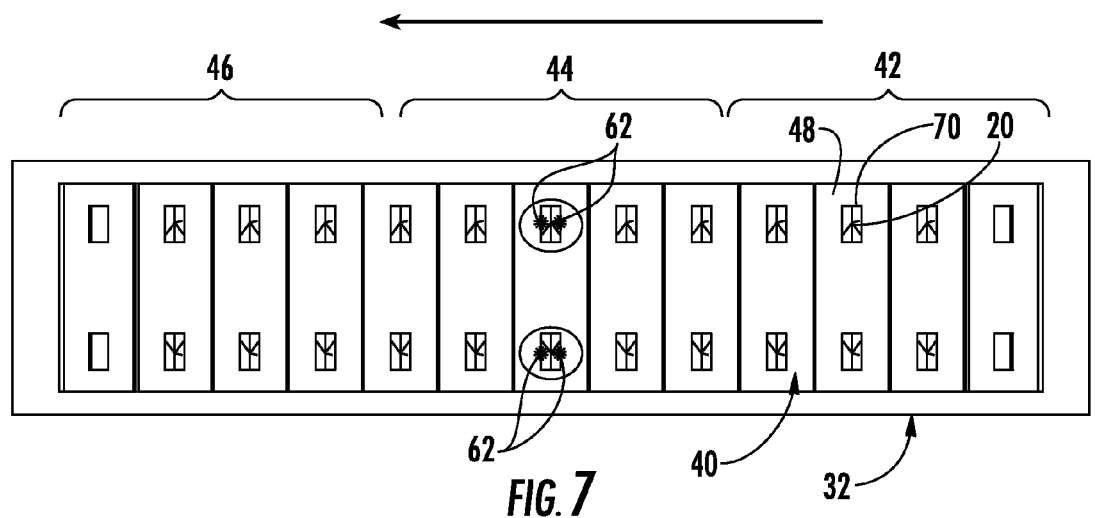
FIG. 7 is a schematic top view of a conveyor for a device as in FIG. 3.
Figure 8:
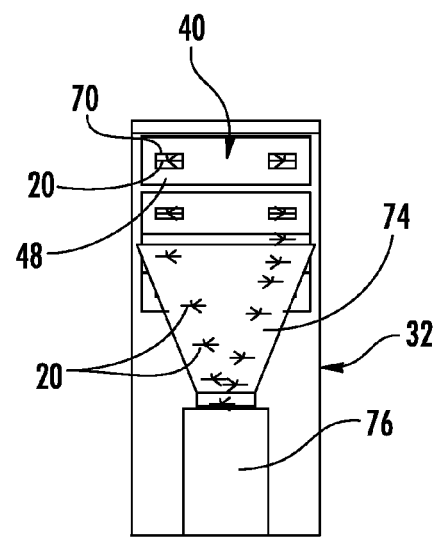
FIG. 8 is a schematic end view of the conveyor of FIG. 7.

Conveyor 40 includes a plurality of slats 48 driven by chains 50. Slats 48 can be joined to adjacent slats, via a hinge, etc., if desired, or simply connected by chains 50 and related structures. Chains 50 engage gears 52, at least one of which is driven via a motor 54. As shown in FIG. 6, output gearbox 56 of motor 54 drives input gear 58 of one of the main gears 52 via a chain 60. It should be understood that various alternate drive configurations are possible for conveyor 40. Also, conveyor can be made of alternate structures than slats 48, such as a web or belt, or other jointed conveyors of various types.

At least one spray head 62 is located in cleaning zone 44, as shown for spraying upward at a bottom side of conveyor slats 48 in that location. As shown in FIG. 6 two such heads 62 are shown. However it should be understood that additional heads could be provided depending on orientation, throughput, line speed, etc. Heads 62 are supplied by a pump 64 and hoses 66. A controller 68 controls operation of pump 64, motor 54, and any other electrically controlled elements. For example, controller 68 can include an input interface allowing a user to set a desired pressure and/or flow rate at heads 62 as dictated by pump 64, as well as a line speed for conveyor 40 as dictated by motor 54.

Slats 48 include openings 70 sized for receiving one or more paws 20. As shown, each opening is sized substantially so as to receive a single paw 20, with supports 72 such as thin rods placed across an inner end of openings 70 to hold the feet. It should be understood that opening 70 may be differently sized, and supports 72 may be differently constructed. Also, each slat 48 is shown as having two openings 70 (see FIGS. 3 and 7), although one or more than two openings could be used. The slats could be replaced by perforated steel pieces, allowing paws to be placed in any desired position.

Paws 20 may be placed by hand in openings 70 in the input zone 42 with any lesions facing downward. When conveyor 40 is driven, the placed paws 20 are then driven through the cleaning zone 44 and hit by spray from spray heads 62, and then to the output zone 46. The paws may be manually removed or simply dumped off the end of conveyor, for example onto a chute 74 for collection in a container 76. Lesions, any other materials removed during spraying, and sprayed water falls into a container such as 78 within conveyor, which can be connected to a drain, filter and solid material collection receptacle if desired.

Spray heads 62 may be high pressure rotating straight stream nozzles driven at a pressure of between 1600 and 3200 psi, rated for a flow rate of 2.0-3.6 gallons per minute (gpm). Suitable spray heads would include Model 22357 Turbo Nozzles, made by General Pump, although other spray heads could be used. Heads 62 may be located for example 1.25 to 2.25 inches below the paws. Conveyor 40 may be driven at approximately 3.0 to 12.0 inches per second. Depending on the number and spacing of heads 62, a paw 20 will accordingly be sprayed for a given amount of time. It is believed that a spraying for about 0.5 to 1.5 seconds is sufficient to remove lesions at such line speeds and pressures. It is important that the parameters chosen substantially remove the lesions, at least from a substantial number of the paws so as to improve grading, without damaging or destroying the paws so as to cause a lowered grading. It is believed that a number of line speeds and head configurations and pressures could be employed to achieve satisfactory results.

Figure 4:
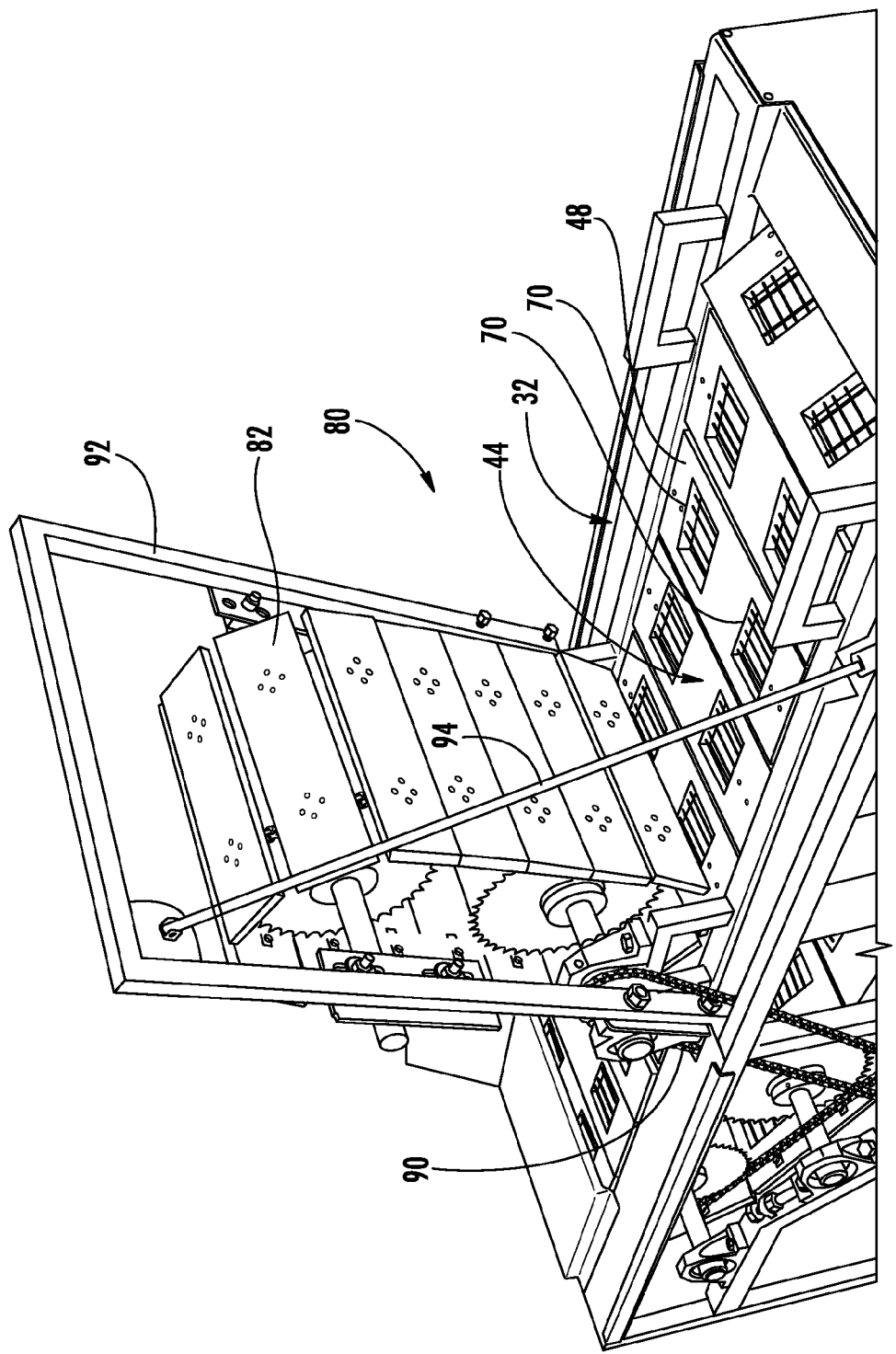
FIG. 4 is a perspective view of a portion of the device of FIG. 3, with a containment conveyor in a lifted position.
Figure 5:
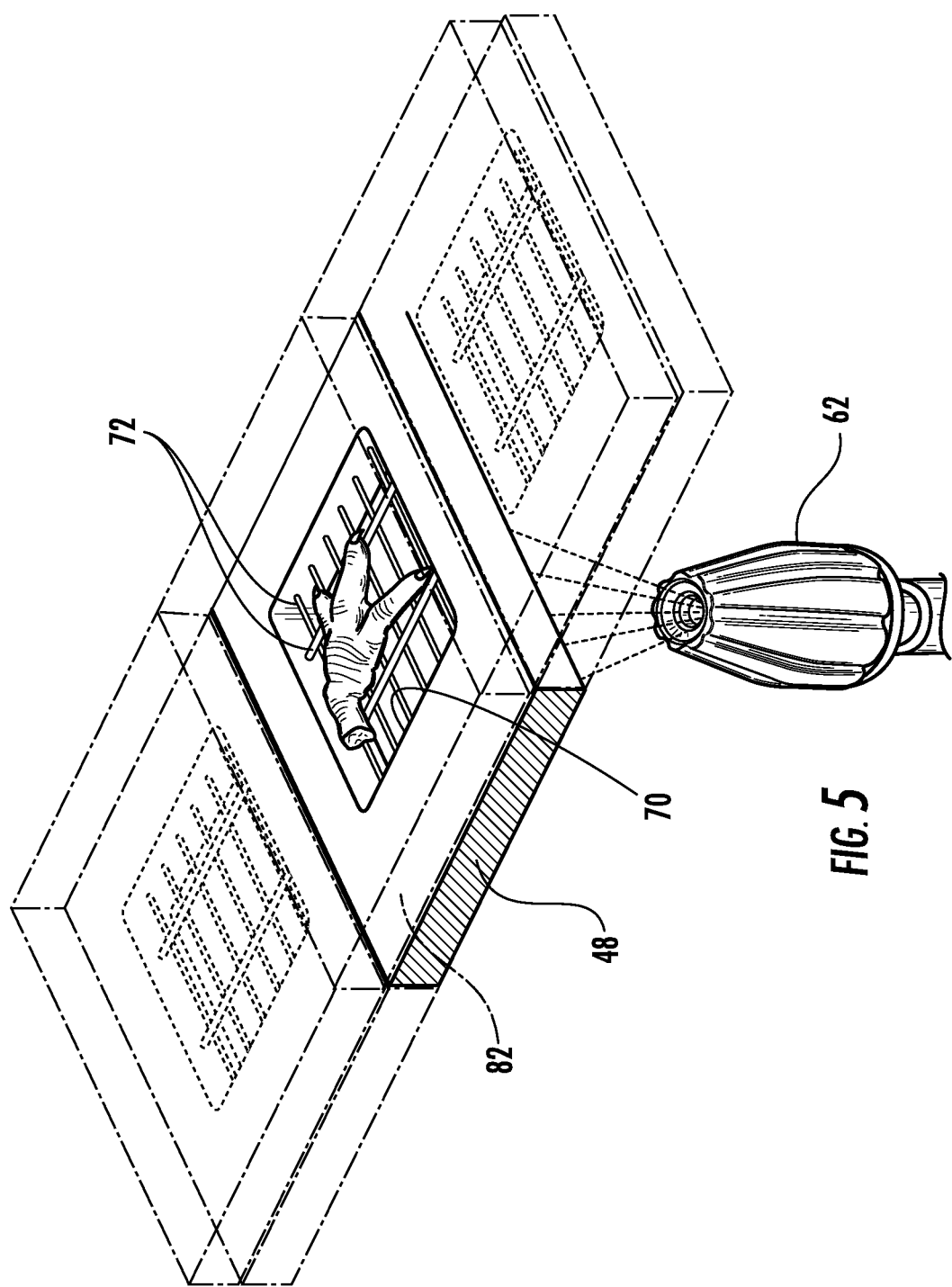
FIG. 5 is a perspective view of a spray head and a chicken paw in a spray zone of a device as in FIG. 3.

If desired, various structures can be used to hold paws in place during spraying. As shown in FIGS. 3, 4 and 6, a containment conveyor 80 may be driven atop conveyor 40 at least over cleaning zone 44. Containment conveyor 80 may include slats 82, or it may also include a web, belt, or other structure. Containment conveyor 80 is driven atop conveyor 40 at a similar or identical speed as conveyor 40 to prevent paws 20 from being dislodged from conveyor 40 by the spraying of heads 62 and to keep water and any removed materials from spraying out. Conveyor 80 can be driven by attached chains 84 and gears 86, which are in turn driven by gear 88 and chain 90 rotatably driven by a motor such as motor 54 or a dedicated motor. If desired, conveyor 80 can be pivotably mounted to frame 32 via a subframe 92 so that it can be lifted for maintenance, cleaning or access to cleaning zone 44 as shown in FIG. 4. A prop rod 94 may be provided to hold frame 92 in the position of FIG. 4, if desired.

Also, if desired, the height of conveyor 80 may be adjustable relative to conveyor 40. Such adjustability could be useful if differently sized paws are to be run through the device and accordingly more spaced is desired. Such adjustment could be achieved by making upper frame 92 adjustable to main frame 32, or making components of conveyor 80 or its drive elements adjustable relative to frame 92.

Accordingly, paws can be placed in openings 70 on conveyor 40 in input zone 42, driven through cleaning zone 44 under conveyor 80 for spraying by heads 62 and then into output zone 46. Lesions and other materials removed from paws and water will fall into container 78. Paws will travel out from under conveyor 80 and can be removed or dropped into container 76. A substantial number of paws will be able to obtain a higher grading as lesions will be substantially removed without causing great damage to the paws. The value of the paws as a whole would thus be greater after processing by device 30 than before. The paws can thus be further cleaned, sorted and packed for shipping as is conventional, and any waste from container 78 can be disposed of.

Figure 9:
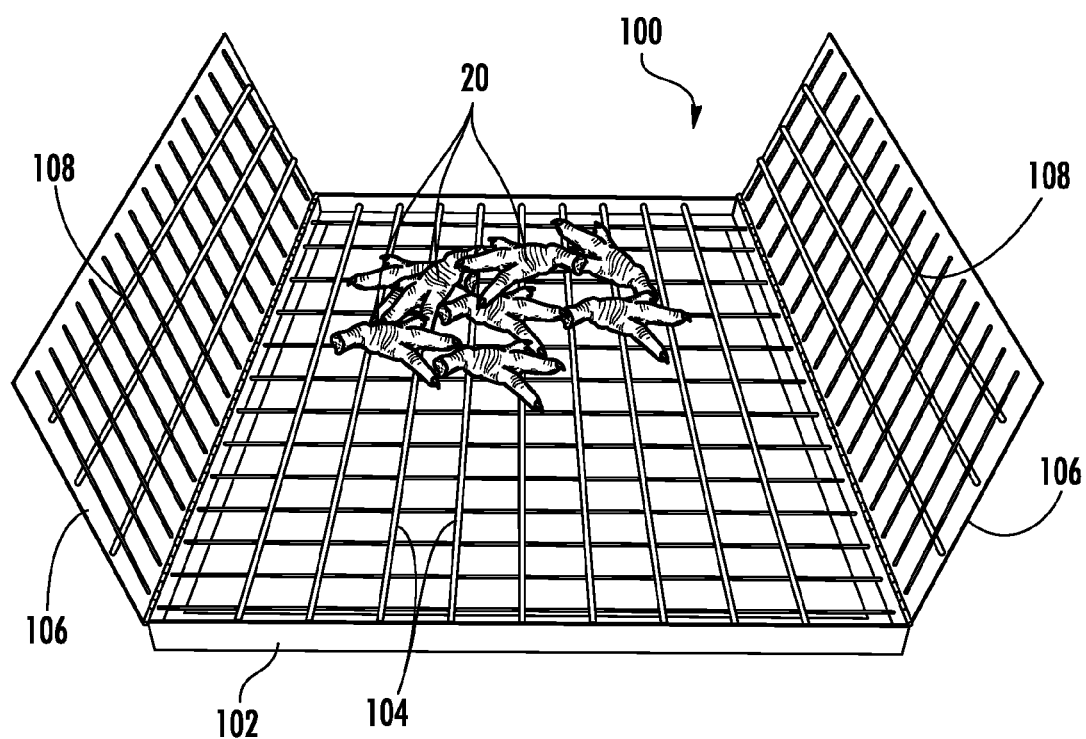
FIG. 9 is a perspective view of a tray used in an embodiment of a modified device without a containment conveyor according to the subject matter disclosed herein.
Figure 10:
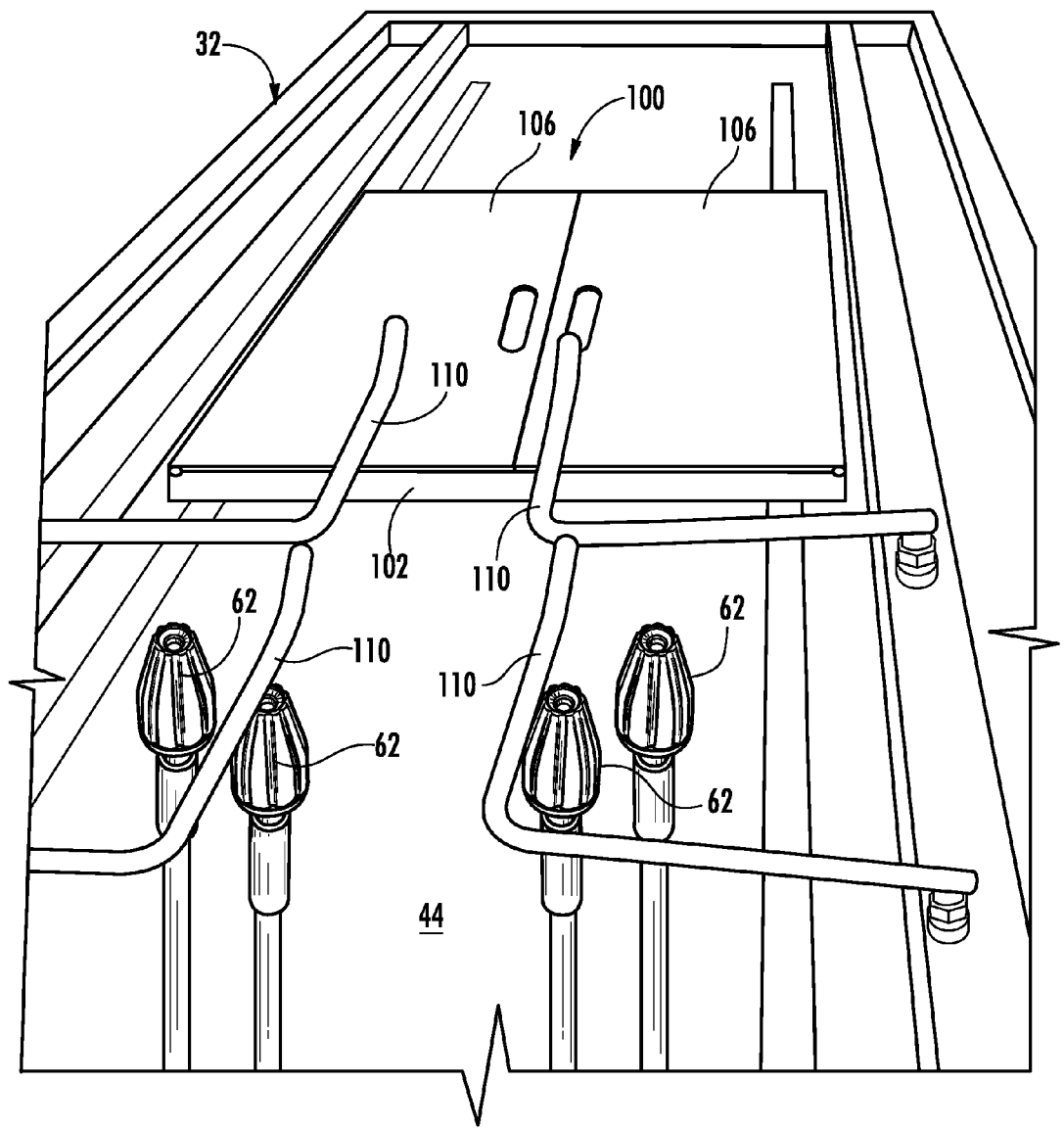
FIG. 10 is a perspective view of a portion of a spray zone with a tray as in FIG. 9 in the modified device.
Figure 11:
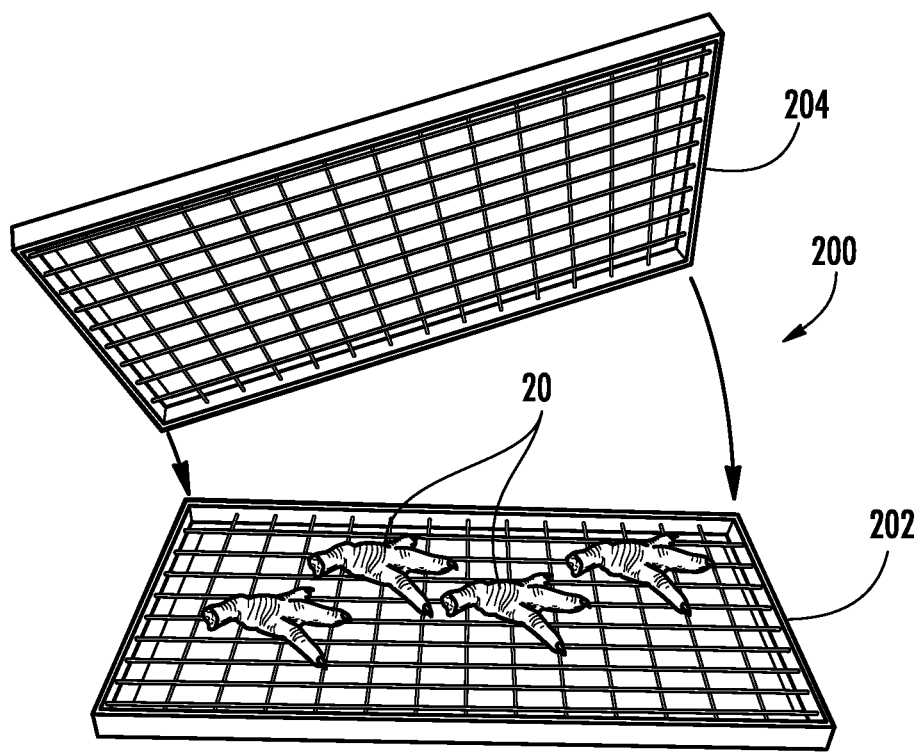
FIG. 11 is a perspective view of an alternate tray to that shown in FIG. 9 used in a modified device without a containment conveyor according to the subject matter disclosed herein.

FIGS. 9 and 10 show a modified portion of device 30 wherein a conveyor 40 and a containment conveyor 80 are not required. A tray 100 can instead be provided having a base 102 open across its bottom and spanned by a support 104, such as a grid of rods. Multiple paws 20 can be placed on base. A top formed in two hinged plate sections 106 is provided for covering the paws once placed on base 102. As shown, a structure 108 such as grid is provided for holding the paws in position during spraying. FIG. 9 shows a few paws only, but the entire surface of base 102 can be covered with paws. Tray 100 is driven through the cleaning zone 44 for example by a chain, etc. attached to a motor such as motor 54. Cleaning zone 44 is modified with guide bars such as retainers 110 rather than a conveyor 80 for holding trays 100 down during spraying and/or holding tops 106 down on bases 102 during spraying. FIG. 11 shows a modified version of tray 100, wherein tray 200 includes separable bottom 202 and top 204 portions, rather than hinged portions.

Using such a tray 100, 200, the paws can be placed in advance in the tray in large groups ahead of time rather than placed one or two at a time directly on a conveyor while in operation. Trays 100, 200 can be manually unloaded as well, which can be done remotely from the device 30. It may be desirable in certain situations to employ such methods of filling and emptying trays in view of the greater number of paws that can be cleaned at once, labor usage, space available in processing plants, etc.

Figures 12A, 12B:
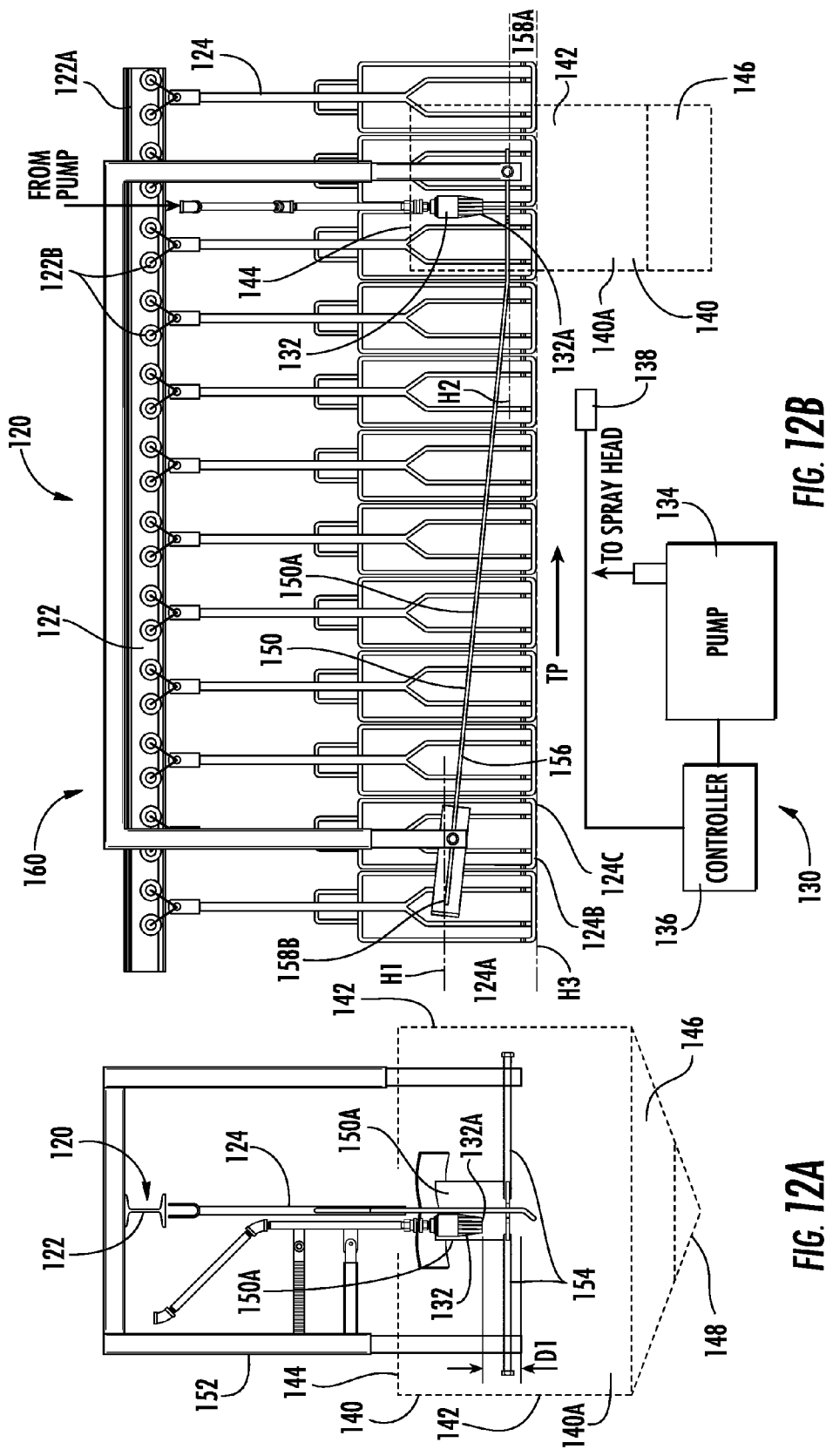
FIG. 12A is a schematic end view of the embodiment of the system using the device for removing lesions from chicken paws configured for use within a chicken processing line according to the subject matter disclosed herein.
FIG. 12B is a schematic side view of an embodiment of a system using a device for removing lesions from chicken paws configured for use within a chicken processing line according to FIG. 12A.
Figure 12C:
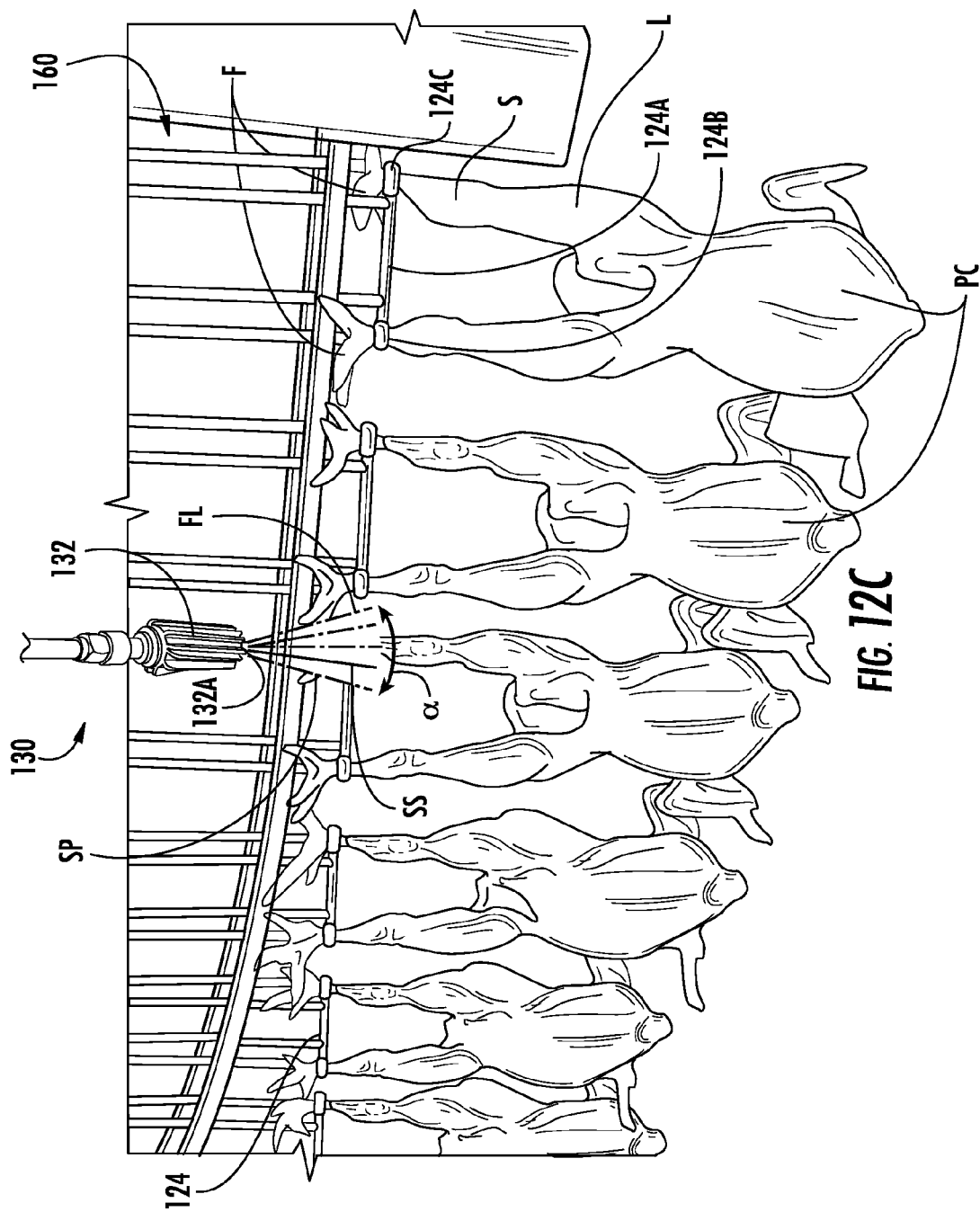
FIG. 12C is a perspective view of the embodiment of the system using the device for removing lesions from chicken paws in use within the chicken processing line according to FIG. 12A.

The systems, methods and devices herein can also be used in poultry processing lines. Poultry processing lines are employed in the poultry industry to quickly, cleanly, and efficiently process poultry for packaging and shipment as a food source. Instead of removing lesions on chicken paws after the paws have been removed from the processed poultry member, such as chickens, the lesion removal devices, systems and methods shown in and described with reference to FIGS. 12A-13D can be installed in the poultry processing line. FIGS. 12A-12C illustrate a portion of a poultry processing line, generally designated 120, that can be used to quickly and efficiently kill, clean and prepare individual poultry members, such as chickens, turkeys, ducks, or the like. Such poultry processing lines 120 are highly automated and swiftly move poultry members therethrough. FIGS. 12A-12C also illustrate a lesion removal system, generally designated 160, that can, in some embodiments, comprise a portion of the processing line 120, such as shackles 124, and can include a device, generally designated 130, for removing lesion material from feet of poultry within the poultry processing line 120.

Poultry processing line 120 can employ a conveyor system 122 that comprises a conveyor rail 122A on which a plurality of transport guide wheels 122B engages and travels along. Transport guide wheels 122B carrier and transport a plurality of poultry member holders, in the form of shackles, 124 that hang down from the conveyor rail 122A. Within a poultry processing plant, live individual poultry members PC are hung upside down on shackles 124 to transport the poultry members PC around along a travel path TP in the processing line 120. Different stations along the processing line 120 kill, clean, and prepare the poultry members PC for packaging and shipping. In particular, shackles 124 can include a hanger portion 124A which forms cuffs 124B, 124C that are stationary relative to one another. The shank area, or shanks, S of legs L of the individual poultry members PC can be securely placed and held in cuffs 124B, 124C as the poultry members PC travel along the travel path TP through the processing line 120 as shown in FIG. 12C. Cuffs 124B, 124C can be spaced apart from one another to facilitate processing of the poultry members PC. In this manner, in such processing line embodiments, the shackles 124 hold the poultry members PC upside down so feet F of the poultry members PC are spaced apart from one another with the bottom of the feet F facing and opening upward so that the soles, for example, the metatarsal pads, of the feet F of the poultry members PC are exposed upward.

Lesion removal device 130 for removing lesion material from poultry feet can be employed along travel path TP of poultry processing line 120 to remove lesion material from the upward facing poultry feet F as the poultry members PC travel along the travel path TP. In particular, lesion removal device 130 can comprise at least one spray head 132 that can be configured to spray the feet F of poultry members PC being processed along a poultry processing line 120 to remove lesion material from the feet F. Spray head 132 can comprise a dispensing end 132A that faces downward toward the path of the upward facing feet F. Spray head 132 and dispensing end 132A can be relatively close in proximity to the feet F of the poultry members PC being processed in the poultry processing line 120 as the poultry members PC move by the spray head 132 along the travel path TP. Spray head 132 can spray the feet F of the poultry members PC with a fluid FL, such as water or other cleaning fluid that is environmental and biologically safe, under pressure as shown in FIG. 12C. Thereby, spray head 132 can remove lesion material from the upwardly facing exposed feet F of the poultry members PC with the pressurized fluid FL being dispensed from the dispensing end 132A of the spray head 132 while not damaging the desirable qualities of the feet F from a consumer standpoint. In some embodiments, the spray head 132 can be about perpendicular to the travel path TP. In some embodiments, the spray head 132 can be slightly angled as measured from a line perpendicular to the travel path TP.

More particularly, device 130 can also comprise a pump 134 for supplying fluid to be dispensed from the spray head 132 and a controller 136 in operational communication with the pump 134 and thereby the spray head 132. Pump 134 can be connected to a fluid source, for example, the processing facilities water supply, in a conventional manner. In some embodiments, the water can be filtered by a filter (not shown) that is internal or external to the pump 134. Pump 134 can further be connected to the spray head 132 by piping and/or hoses configured to handle the fluid pressures needed to safely and desirably remove lesions from the poultry feet F, or paws, of the poultry members PC passing by. The spray head 132 in conjunction with the pump 134 based on the design of the spray head 132 and capacity of the pump 134 generate the fluid pressures needed to safely and desirably remove lesions from the poultry feet F, or paws.

Controller 136 through operable communication with the pump 134 and this motor can be configured for controlling the dispensing of fluid FL from the spray head 132 and the amount of pressure of the fluid FL dispensed from the spray head 132. In particular, by controlling the output of the pump 134, the controller can set the output of the pump 134 based on the design of the spray head 132, how the fluid FL is dispensed therefrom, a distance $D_1$ between the dispensing end 132A of the spray head 132 and the feet F of the poultry members PC, and/or the amount of time of exposure of each foot to the spray provided by speed of the conveyor system 122 of the poultry processing line 120. In this manner, controller 136 can be configured for controlling the dispensing of the fluid FL from the spray head 132 at a fluid pressure generated by the spray head 132 and the pump 134 to generate a fluid speed so that the dispensed fluid FL creates a force upon impact that removes the undesirable lesion material from the feet F, but does not destroy the integrity of the feet F.

In addition to controlling the pump 134, the controller 136 can control operation of any other electrically controlled elements of the lesion removal device 130. For example, controller 136 can include an input interface allowing a user to set, rest, and/or adjust the pressure and/or flow rate at the spray heads 132 as dictated by pump 134.

As stated above, the controller 136 can set or adjust the pressure and flow rate based on the design of the spray head 132 and capacity of the pump 134. By controlling the pump 134, controller 136 can be configured to stop and start the supply of fluid FL to the spray head 132 and to regulate the fluid pressure based on the rate at which the pump provides fluid to the spray head 132. In operation, the spray head 132 can be configured to supply fluid FL at a pressure of between about 1600 psi and 3200 psi and a flow rate of between about 3.0 gpm and 7.0 gpm. For example, the spray head 132 can supply fluid FL at a pressure of about 2700 psi and a flow rate of about 5.0 gpm.

Spray head 132 can be a high pressure rotating straight stream nozzle, or a rotary spray head. Spray head 132 can comprise a single stream rotary spray head that can be configured to create a conical spray path SP around which a single stream SS of the dispensed fluid can rotate. For example, in some embodiments, the spray head 132 can rotate stream SS of fluid FL being dispensed at a rate of between about 80 and about 150 rotations per second. For instance, in some embodiments, the spray head 132 can rotate the stream SS of fluid FL being dispensed at a rate of about 120 rotations per second (i.e., 30 rotations per ¼ second). For example, the fluid stream SS can be a 0-degree fluid stream, while the conical spray path can have a spray angle α of between about 0 degrees and about 8 degrees. In some embodiments, the spray angle α of the spray path can be about 2 degrees. In some embodiments, the spray angle α of the spray path can be about 6 degrees.

In operation, based on the distance $D_1$ between the dispensing end 132A of the spray head 132 and the feet F of the poultry members PC (see FIG. 12B), spray head 132 can be configured to create the spray path SP of stream SS to form an impact path that comprises the points of impact against the feet F or the points along the stream in a plane in which the feet F reside in the travel path where impact should occur against the feet F. The impact path created by the stream SS should be large enough to enable the rotating stream SS to impact the feet F in a manner to remove the lesion material from the feet F as needed, but not to large so as to miss the feet F and/or not provide the necessary lesion removal when the pump 134 and spray head 132 are generating an acceptable fluid pressure and flow rate. The size of the impact path can be affected, for instance, by the angle of the spray path and/or the distance $D_1$ between the dispensing end 132A of the spray head 132 and the feet F of the poultry members PC which can, in turn, be affected by other factors and parameters. In practice, for example, in some embodiments, the spray heads 132 can be located at a distance $D_1$ of between about 1.25 and about 2.25 inches from the feet F. In some embodiments, for example, the spray heads 132 can be located at a distance $D_1$ of between about 1.5 and about 2 inches from the feet.

Controller 136 can be configured to shut off the supply of fluid FL to the spray head while the processing line stops or shuts down. Further, the device 130 can comprise a sensor 138 that can be configured to detect the presence of poultry members PC travelling along travel path TP. The sensor can be in communication with the controller 130 and can be positioned relative to the plurality of shackles 124 so as to detect the presence of a poultry member PC on the shackles 124 that pass the sensor 138. The sensor 138, for example, can be a laser sensor. A predetermined time limit can be set. If the sensor 138 does not sense the presence of a poultry member PC during any given length of the predetermined time limit, the control will shut off the pump and thus shut off the supply of fluid FL to the spray head 132. For example, in some embodiments, the predetermined time limit can be between about 3 seconds and about 10 seconds. For instance, in some embodiments, the predetermined time limit can be about 5 seconds. In some embodiments, the predetermined time limit can be adjustable through a user interface on either the sensor 136 or the controller 138 to provide flexibility.

As stated above, the desired level of fluid pressure as well as other possible factors described above that can impact the ability of the device 130 to provide the desired lesion removal from the feet F of the poultry members PC can affect the amount of time each poultry foot F is given to be sprayed with the dispensed fluid FL by the spray head 132. In some embodiments, each poultry foot F is sprayed by the spray head 132 from about 0.25 to about 1.5 seconds. For the embodiments of the lesion removal device shown in FIGS. 12A-12C described herein, the amount of time that each poultry foot F is given to be sprayed with the dispensed fluid FL by the spray head 132 is dictated by the speed of the poultry processing line 120 and the conveyor system 122 therein. Thus, the amount of time that each poultry foot F is given to be sprayed by the spray head 132 is dependent upon the speed of the poultry processing line and would likely not be changed to just accommodate the lesion removal device 130. Therefore, the other factors and parameters can be adjusted to accommodate the time permitted by the processing line. These adjustments, in addition, to the one outlined above, can include adding additional spray heads in line with spray head 132.

In some embodiments, lesion removal system 160 and/or lesion removal device 130 can optionally comprise a containment structure 140 (shown in dotted lines) that can be positioned in proximity to the spray head to divert used fluid and waste product. The waste product produced using the lesion removal system 160 and/or lesion removal device 130 may in some instances be considered environmentally and biologically harmful to the operators within a poultry processing line under enough exposure. Additionally, the waste product is produced using very high velocity fluids that, in some instances, may cut and tear through flesh and bone if accidentally encountered by an operator. The high velocity fluids can also cause widespread dispersion of used fluids and waste products from the impact points with the poultry members, which can contaminate production at surrounding stations, or even surrounding processing lines. Further, the amount of fluid used can be a large volume that can build up and/or back up quickly, if not given a dissipation outlet. Therefore, structures that can divert, contain, and remove the waste product and used fluids from around the lesion removal devices and systems as well as the poultry processing lines can be beneficial.

Containment structures, such as containment structure 140 (shown in dotted lines in FIGS. 12A and 12B as optional), can be used to help contain, divert and/or remove the waste product and used fluids. As shown in FIGS. 12A-12C, in some embodiments, the containment structure 140 can comprise a containment enclosure 140A that houses the spray head 132A and form a cleaning zone therein. The containment enclosure 140A can enclose a portion of the travel path TP and the poultry processing line 120 where the lesion removal method is performed. For example, the containment enclosure 140A can comprise side walls 142 on either side of the travel path. In some embodiments, the containment enclosure 140A can optionally comprise a top wall 144 with a channel through the middle and can be open on or contain an opening in either end to accommodate the conveyor system 122 and thus be configured to permit the passing of the shackles 124 and the poultry members PC therethrough. To facilitate removal of the waste product and used fluids, the containment enclosure 140A can also comprise a trough, or catch tray, 146 that can collect the waste product and used fluid and direct it to a drain 148 in the containment enclosure 140A to drain the used fluid from the spray heads 132 and to drain waste product of material removed from the poultry feet F.

In some embodiments, lesion removal device 130 and/or lesion removal system 160 can comprise a guide such as guide bars, or guide rails, 150 positioned relative to the travel path TP of the plurality of shackles 124 to facilitate positioning of the feet F of the poultry members PC held by the shackles 124 within a spray path SP of the spray head 132. In particular, at least one guide bar 150 can be positioned relative to the travel path TP of the plurality of shackles 124 to position the shackles 124 so that the feet F of each poultry member PC travel through the spray path SP. As shown in FIGS. 12A-12C, a pair of guide bars 150 can be provide with the guide bars 150 positioned on either side of the travel path TP of the plurality of shackles 124 so that shackles 124 pass between the guide bars 150. Guide bars 150 can be held in place on the conveyor system with a frame 152 that position the guide bars 150 relative the conveyor system 122 and travel path TP. Guide bars 150 can have adjusters 154 to allow to adjusting the guide bars 150 to proper alignment. While shown beside the guide bars 150 in FIG. 12B, in some embodiments, spray head 132 can be located just past the guide bars 150 along the travel path TP.

The guide bars 150 can be configured to contact each foot F of the poultry members PC hanging from shackles 124 and being processed to position the respective feet F of the poultry members PC relative to the spray head 132 so that the feet F are located at a distance $D_1$ between the dispensing end 132A of the spray head 132 and the feet F of the poultry members PC. In particular, each guide bar can comprise a guide body 150A that has a poultry foot contact surface 156 that, depending on the orientation of the shackles relative to the respective guide bodies, can contact the bottom of each foot facing upward as the poultry member PC hangs from the respective shackle 124. Due to the speed at which operators must quickly insert the legs L into the cuffs 124A, 124B and the processing of the poultry members PC that occurs along processing lines 120, the positioning of the feet F of the poultry member PC within and relatively to the hanger portion 124A of the shackles 124 can vary so that the feet extend upward from the cuffs 124B and 124C at various heights. The foot contact surface 156 can contact and direct higher extending the feet of the poultry members PC downward toward the cuffs 124B and 124C to an extending height that is more consistent. In this manner, distance $D_1$ between the dispensing end 132A of the spray head 132 and the passing feet F of the poultry members PC can be more consistently maintained if the height at which the feet extend from the cuffs 124B and 124C are more consistent.

To accomplish this increased consistency, a guide body 150A can comprise a proximal end 158A and a distal end 158B. The proximal end 158A can be positioned closer to the spray head 132 while the distal end 158B can be positioned further away from the spray head 132. Each guide bar 150 can be installed so that poultry foot contact surface 156 can be angled with the distal end 158B of each guide body 150A residing in a first horizontal plane H1 and the proximal end 158A of each guide body 150A residing in a second horizontal plane H2 that is below the first horizontal plane H1. The hanger portion 124A of the shackles 124 can reside in a third horizontal plane H3 that is located below horizontal plane H2. In this manner, distal end 158B is positioned higher than the proximal end 158A of each guide body 150A and further away from horizontal plane H3 in which the hanger portions 124A of the shackles 124 pass.

Thereby, the contact surface 156 can be sloped downward in the direction of travel of the shackles 124 and the poultry members PC so that the feet F of poultry members PC that extend higher from the hanger portions 124A of the shackles 124 are pushed downward toward the hanger portions 124A as the poultry members PC travel along travel path TP to a more consistent level that can improve the consistency of the lesion removal from the feet F by the spray head 132. The positioning of the spray head 132 at such a lower proximal end 158A of the respective guide bodies 150A can be beneficial in improving the removal of lesion material from the feet F. Due the size of the distance $D_1$ between the dispensing end 132A of the spray head 132 and the feet F of the poultry members PC, the distal end 158B of each guide body 150A can be positioned above the dispensing end 132A of the spray head 132 and the proximal end 158A of each guide body 150A can be positioned below the dispensing end 132A of the spray head 132.

Figure 13C:
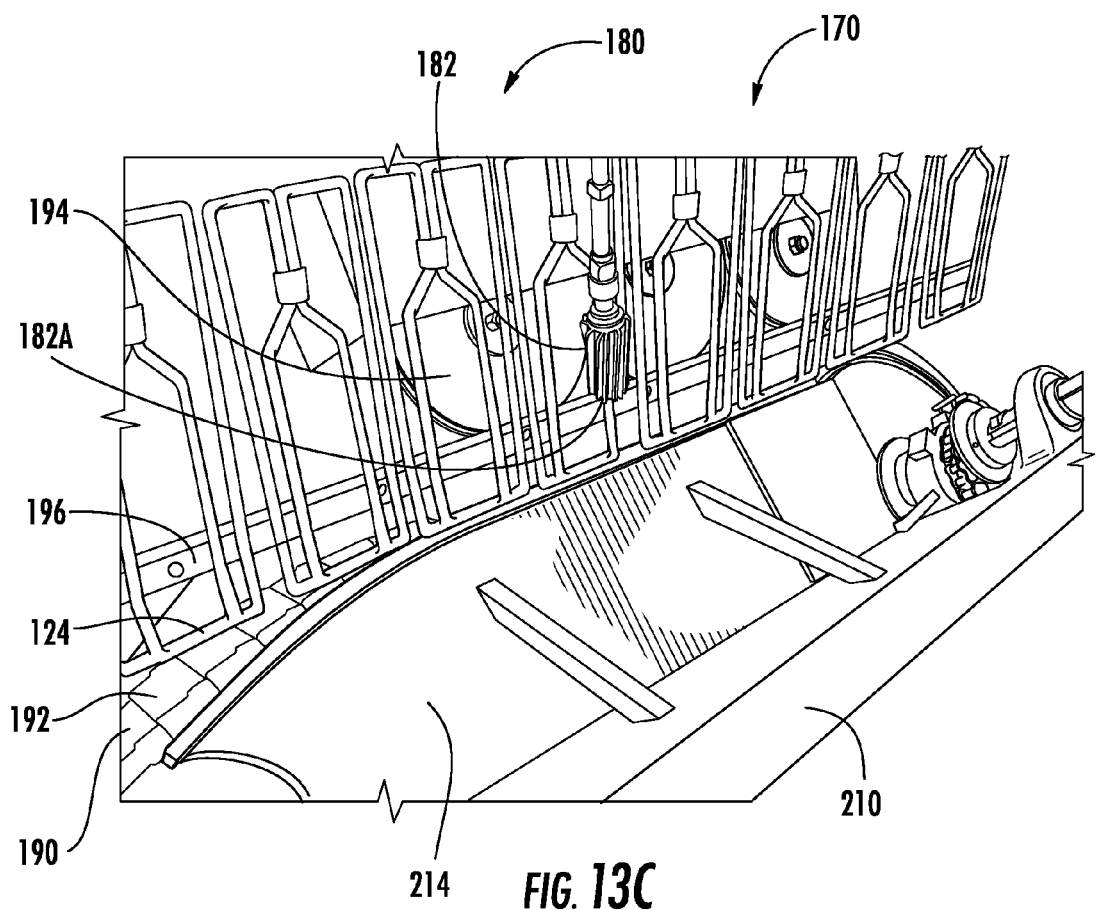
FIG. 13C is a perspective view of the embodiment of the system using the device for removing lesions from chicken paws configured for use within a chicken processing line according to FIG. 13A.
Figure 13D:
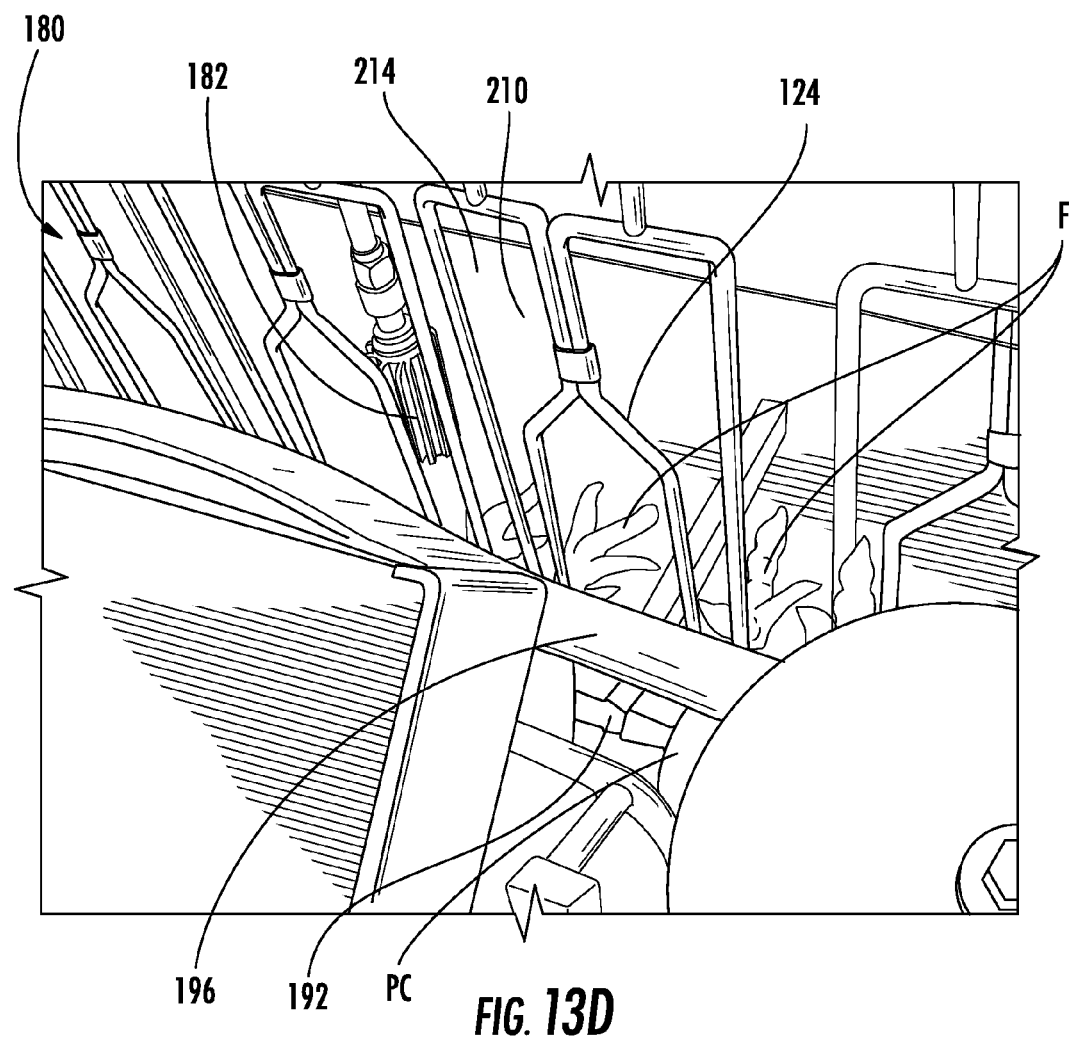
FIG. 13D is a perspective view of the embodiment of the system using the device for removing lesions from chicken paws in use within the chicken processing line according to FIG. 13A.

Referring to FIGS. 13A-13C, a processing line 120 as described above is provided with a lesion removal system, generally designated 170, that can comprise a portion of the processing line 120, such as shackles 124, and can include a device, generally designated 180, for removing lesion material from feet of poultry within the poultry processing line 120. The embodiments of the lesion removal system 170 and the lesion removal device 180 are also similar to the embodiments of the lesion removal system 160 and the lesion removal device 130 as described above. So, such similar portions of the lesion removal system 170 and the lesion removal device 180 are described herein in less detail than those embodiments described above.

The lesion removal system 170 and lesion removal device 180 can comprise at least one spray head 182 located along the travel path TP of the plurality of shackles 124 with the spray head 182 configured to spray feet F of the poultry members PC held by the plurality of shackles 124 to remove the lesion material from the feet F. The spray head 182 can be a rotary head as described in detail above.

The lesion removal device 180 can comprise a controller 186 in operational communication with the spray head 182. The controller 186 can be configured for controlling a dispensing of fluid FL from the spray head 182 and a fluid pressure of the spray head 182. The lesion removal device 180 can also comprise a pump 184 for supplying fluid FL to be dispensed from the spray head 182. The pump 184 can connected to a fluid source and the spray head 182 by piping hoses, or the like, to supply fluid FL to the spray head 182. Further, the pump 184 can be in operational communication with the controller 186 to permit control of the pumping of the fluid FL to the spray head 182.

The controller 186 can be configured to stop and start the flow of fluid FL to the spray head 182 and to regulate the fluid pressure based on the rate at which the pump 154 provides fluid FL to the spray head 182. As above, the fluid pressure exiting a dispensing end 182A of the spray head 182 can be in the range of about 1600 psi to about 3200 psi. In some embodiments, for example, the fluid pressure exiting a dispensing end 182A of the spray head 182 can be about 2700 psi. Further, the flow rate at which fluid is dispensed from the spray head 182 can be between about 3.0 gpm and about 7.0 gpm. For example, in some embodiments, the flow rate at which fluid is dispensed from the spray head 182 can be about 5 gpm.

As in the embodiments described above, the lesion removal device 180 can comprise a sensor 188 for detecting the presence of poultry members PC. The sensor 188 can be in wireless or wired communication with the controller 186 and can be positioned relative to the plurality of shackles 124 to detect the presence of a poultry member PC on each shackle 124 that passes the sensor 188. In some embodiments, sensor 188 can be a laser sensor.

As above, in some embodiments, lesion removal device 180 and/or lesion removal system 170 can comprise a poultry positioning guide 190 located relative to the travel path TP of the plurality of shackles 124 to facilitate positioning of the feet F of the poultry members PC held by the shackles 124 within a spray path SP. In particular, the poultry positioning guide 190 can be disposed relative to the travel path TP of the plurality of shackles 124 in a position that, during operation of the processing line 120, permits the poultry positioning guide 190 to contact a portion of the poultry members PC secured to the shackles 124. More particularly, the poultry positioning guide 190 can be configured to contact the portion of the poultry members PC being processed to facilitate the positioning of the respective feet F of the poultry members PC relative to the spray head 182 so that a portion of each poultry foot F prone to developing lesions can be more consistently located in spray path SP of the spray head 182 at a desired position. In such embodiments, the spray head 182 can be positioned above the positioning guide 190 with the dispensing end 182A facing downward toward the positioning guide 190.

For example, in some embodiments, the poultry positioning guide 190 can be located relative to the travel path TP of the plurality of shackles 124 and relative to the manner in which the poultry members PC are hung on the shackles 124 such that the poultry positioning guide 190 contact backsides of the shank areas, or shanks, S of the legs L of the poultry member PC. As used herein, a backside of a shank S is on the side of the shank S opposite to the side of the foot F where the toes of the foot F open and on which the sole, including the metarsal pad, of the foot F resides. It is contemplated that pressure placed on the backside of a shank S of a leg L of a poultry member PC by the positioning guide 190 can facilitate the opening of the foot F to expose its sole where lesions are prone to occur. It is believed that due to the fact that the backside of a shank S includes tendons therein that are used to extend the toes of a foot F into an open position, similar to the tendons in the back of a human's foot or hand, pressure apply by the positioning guide 190 can facilitate the opening of the foot F facing upward in the shackles 124. In this manner, the portion of each poultry foot F prone to developing lesions is more likely and readily exposed.

In some embodiments, the poultry positioning guide 190 can comprise a conveyor 192 configured to stabilize and move with the contacted portion, such as the shanks S, of the poultry members PC. In particular, the poultry positioning guide can comprise a portion of a shank cutter 194 of the processing line 120 that is configured to sever the legs L of the poultry members PC being processed. In some embodiments, the poultry positioning guide 190 can further comprise an upper guide bar 196 that can be positioned relative to the conveyor 192 at a distance $D_2$ to provide clearance for the contacted portion of the poultry members PC being processed. Additionally, the upper guide bar 196 can facilitate the stabilizing of the contacted portion of the poultry members PC being processed. The embodiments of the lesion removal system 170 and the lesion removal device 180 that employ the positioning guide 190 can also include guide bars, like the guide bars 150 shown in FIGS. 12A and 12B. As described above, each guide bar can comprise a guide body having a poultry foot contact surface that can position the respective feet of the poultry members relative to the spray head so that the feet are located at a substantially consistent distance from the spray head when passing under the spray head. Such guide bars can be positioned along the travel path TP before the positioning guide 190.

As with the embodiments described above, lesion removal system 170 and/or lesion removal device 180 can comprise a containment structure 210 that can be positioned in proximity to the spray head 182 to divert used fluid and waste product. In particular, the containment structure 210 can comprise a splash guard 212 that can be used to block and divert splattering waste product and used fluid. The containment structure 210 can comprise a trough, or a catch tray, 214 and a drain (shown in dotted lines) 216 in the catch tray 214 for draining used fluid from the spray heads 182 and for draining waste product of material removed from the poultry feet F.

Thus, using the lesion removal systems and lesion removal devices described above, methods for removing lesion material from the feet of poultry within a poultry processing line can be performed. The method can include positioning at least one spray head along a travel path of poultry members being processed within a poultry processing line. As outlined above, the spray head can comprise a dispensing end in proximity to the feet of the poultry members being processed in the processing line as the poultry members move by the spray head along the travel path to remove the lesion material from the feet. The feet of the poultry members can then be sprayed with fluid under pressure so that the lesion material from the feet of the poultry members is removed by the fluid being dispensed from the dispensing end of the spray head. To facilitate the removal of the lesion material from the feet, the feet of the poultry members can be guided into a spray path of the spray head. Further, used fluid and waste product produced by the spraying can be diverted, contained, and/or removed from the area around the removal device with a containment structure.

In view of the above, various options for a device for removing material from poultry feet are disclosed. The designs are subject to modification and application across different models and using different options. For example, it should be understood that the present device could be employed as a standalone device, loaded by hand. Instead, the device could be used within a processing line, using an automatic paw loading machine. Any number of heads could be used beneath conveyor 40. For example, four such heads may provide an optimal balance of throughput and water usage, although other arrangements are possible. Further, multiple devices can be arranged together, for example side by side, in a processing facility if desired to increase throughput. Also, the present device could be modified so as to be attachable or includable as part of another processing machine, as opposed to be a standalone assembly. Therefore, any and all such modifications and options should be understood as being within the scope of the present invention.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

I claim:

1. A method for removing lesion material from feet of poultry within a poultry processing line, the method comprising:

positioning at least one spray head along a travel path of poultry members being processed within a poultry processing line, the spray head comprising a dispensing end in proximity to feet of the poultry members being processed in the processing line as the poultry members move by the spray head along the travel path to remove the lesion material from the feet;

spraying the feet of the poultry members with fluid under pressure; and removing lesion material from the feet of the poultry members with the fluid being dispensed from the dispensing end of the spray head.

2. The method of claim 1, further comprising wherein the spraying the feet of the poultry members comprises spraying the fluid from the dispensing end of the spray head at a fluid pressure in the range of about 1600 to about 3200 psi.

3. The method of claim 1, wherein the spraying the feet of the poultry members comprises spraying each poultry foot in the range of about 0.25 to about 1.5 seconds.

4. The method of claim 1, wherein the spraying the feet of the poultry members comprises dispensing fluid at a rate of about 5 gallons per minute (gpm).

5. A device for removing lesion material from poultry feet comprising at least one spray head configured to spray soles of upward facing feet of poultry members being processed along a poultry processing line to remove lesion material from the feet.

6. The device of claim 5, wherein the spray head is a rotary spray head.

7. The device of claim 6, wherein the spray head is configured to create a spray path with a dispensed fluid that operates in a cleaning zone through which a portion of each poultry foot prone to developing lesions passes.

8. The device of claim 5, further comprising a controller configured for controlling the dispensing of the fluid from the spray head at a fluid pressure that removes lesion material from the feet, the controller being configured to stop and start the supply of fluid to the spray head.

9. The device of claim 8, wherein the fluid pressure generated by the spray head is in the range of about 1600 to about 3200 psi.

10. The device of claim 9, wherein the spray head has a flow rate of about 5 gallons per minute (gpm) to about 7 gpm per spray head.

11. The device of claim 8, further comprising a sensor for detecting the presence of poultry members, the sensor being in communication with the controller and positioned relative to a plurality of shackles where each shackle is configured to hold a poultry member in a processing position as the shackles are moved along the poultry processing line, the sensor being positioned to detect the presence of a poultry member on each shackle that passes the sensor and the controller being configured to shut off the supply of fluid to the spray head if the sensor does not detect the presence of a poultry member within a predetermined time limit.

12. The device of claim 11, further comprising a guide positioned relative to a travel path of the plurality of shackles to facilitate positioning of the feet of the poultry members held by the shackles within a spray path.

13. The device of claim 8, wherein the controller is configured to regulate the fluid pressure generated by the spray head.

14. The device of claim 8, further comprising a pump in operable communication with the controller for supplying fluid for dispensing from the spray head, the pump being connected to a fluid source and the spray head to supply fluid to the spray head.

15. The device of claim 5, further comprising a containment structure comprising at least one of a splash guard, a catch tray, or a containment enclosure and positioned in proximity to the spray head to divert used fluid and waste product.

16. The device of claim 15, further comprising a drain for draining used fluid from the spray heads and for draining waste product of material removed from the poultry feet.

17. The device of claim 15, further comprising a pump for supplying fluid for dispensing from the spray head, the pump being connected to a fluid source and the spray head to supply fluid to the spray head.

18. The device of claim 5, further comprising a guide positioned relative to a travel path of a plurality of shackles where each shackle is configured to hold a poultry member in a processing position as the shackles are moved along the poultry processing line, the guide being configured to facilitate positioning of the feet of the poultry members held by the shackles within a spray path.

19. The system of claim 18, wherein the guide comprises at least one guide bar that is configured to contact each foot of the poultry members being processed and passing thereby to position the respective feet of the poultry members relative to the spray head so that the feet are located at a substantially consistent distance from the spray head of about 1.25 inches to about 2 inches.

20. The system of claim 18, wherein the guide comprises a poultry positioning guide disposed relative to the travel path of the plurality of shackles in a position that, during operation of the processing line, permits the poultry positioning guide to contact a portion of the poultry members secured to the shackles.

* * * * *